United States Patent
Kamata et al.

(10) Patent No.: US 7,067,207 B2
(45) Date of Patent: Jun. 27, 2006

(54) MAGNETIC RECORDING MEDIUM HAVING A PATTERNED SOFT MAGNETIC LAYER

(75) Inventors: Yoshiyuki Kamata, Tokyo (JP); Masatoshi Sakurai, Tokyo (JP); Akira Kikitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 10/702,439

(22) Filed: Nov. 7, 2003

(65) Prior Publication Data

US 2004/0091748 A1    May 13, 2004

(30) Foreign Application Priority Data

Nov. 8, 2002    (JP)    ............ P2002-326057

(51) Int. Cl.
G11B 5/667    (2006.01)
G11B 5/73    (2006.01)

(52) U.S. Cl. ............... 428/836; 428/829; 428/848.3
(58) Field of Classification Search ............... None
See application file for complete search history.

(56) References Cited

U.S. PATENT DOCUMENTS

| | | | |
|---|---|---|---|
| 5,956,216 A | 9/1999 | Chou | 360/131 |
| 5,995,309 A * | 11/1999 | Suzuki et al. | 360/55 |
| 6,347,016 B1 * | 2/2002 | Ishida et al. | 360/17 |
| 6,579,634 B1 * | 6/2003 | Saito | 428/694 T |
| 6,703,099 B1 * | 3/2004 | Belser | 428/64.2 |
| 6,772,507 B1 * | 8/2004 | Aoki | 29/603.16 |
| 6,790,534 B1 * | 9/2004 | Nishikawa et al. | 428/457 |
| 2002/0093581 A1 | 7/2002 | Ikeda et al. | 348/241 |
| 2002/0136927 A1 | 9/2002 | Hieda et al. | 428/694 |
| 2002/0168548 A1 | 11/2002 | Sakurai et al. | 428/694 |
| 2003/0127007 A1 | 7/2003 | Sakurai et al. | 101/483 |
| 2004/0107355 A1 | 6/2004 | Sakurai et al. | |

(Continued)

FOREIGN PATENT DOCUMENTS

JP    05-081640    4/1993

(Continued)

OTHER PUBLICATIONS

Shouheng Sun et al., "Synthesis of monodisperse cobalt nanocrystals and their assembly into magnetic superlattices (invited)", Journal of Applied Physics, vol. 85, No. 8, pp. 4325-4330, (Apr. 15, 1999).

(Continued)

Primary Examiner—Kevin M. Bernatz
(74) Attorney, Agent, or Firm—Finnegan, Henderson, Farabow, Garrett & Dunner, L.L.P.

(57) ABSTRACT

A magnetic recording medium includes a non-magnetic substrate; a soft magnetic layer which is formed on the non-magnetic substrate and which includes projected parts arranged on the surface thereof and recessed parts surrounding each of the projected part; and a ferromagnetic layer which is formed on the soft magnetic layer and which includes projected parts and recessed parts reflecting the projected parts and the recessed parts of the soft magnetic layer. Further the magnetic recording medium includes recording areas which have perpendicular magnetic anisotropy and ferromagnetism, and which are formed of the projected parts of the ferromagnetic layer and separated magnetically from their surroundings. A method for manufacture of the magnetic recording medium includes forming a soft magnetic layer including of projected parts arranged regularly on the surface thereof and recessed parts surrounding each projected part; and forming a ferromagnetic layer having perpendicular magnetic anisotropy on the soft magnetic layer.

10 Claims, 8 Drawing Sheets

U.S. PATENT DOCUMENTS

2004/0131890 A1 * 7/2004 Kikitsu et al. .......... 428/694 B

FOREIGN PATENT DOCUMENTS

| JP | 6-19632 | 1/1994 |
| --- | --- | --- |
| JP | 10-149539 | 6/1998 |
| JP | 3057586 | 4/2000 |
| JP | 2001-176049 | 6/2001 |
| JP | 2001-256630 | 9/2001 |

OTHER PUBLICATIONS

Notification of Reasons for Refusal issued by the Japanese Patent Office dated Jan. 24, 1006, for Japanese Patent Application No. 2002-326057, and Enblish-language translation thereof.

* cited by examiner

ION MILLING

ION MILLING

MAGNETIC RECORDING MEDIUM HAVING A PATTERNED SOFT MAGNETIC LAYER

CROSS REFERENCE TO RELATED APPLICATIONS

This application is based upon and claims the benefit of priority from prior Japanese Patent Application No. 2002-326057, filed on Nov. 8, 2002; the entire contents of which are incorporated herein by reference.

BACKGROUND OF THE INVENTION

1. Field of the Invention

The present invention relates to a high density magnetic recording technology and particularly to a patterned media capable of high density perpendicular magnetic recording and a method for manufacture thereof.

2. Description of the Related Art

In recent years, with the progress of multimedia application of data such as pictures, images, and voice, and an amount of information data for searching per user has increased. Therefore, a larger capacity and higher speed of database are required. Meanwhile, due to improvement in the surface recording densities of magnetic recording media associated with increases in the recording capacity of Hard Disk Drives (HDDs), each record bit size of a magnetic recording medium is becoming extremely fine to be about several tens nm. In order to obtain a reproducing output from this very fine recording bit, as large a saturation magnetization and film thickness as possible need to be secured for each bit. However, when the recording bit is made fine, the volume of switching unit (V) of each bit is reduced, involving a problem such that magnetization inversion due to thermal fluctuation causes loss of magnetized information.

Generally, the influence of this thermal fluctuation becomes larger as the value of Ku·V/kT becomes smaller, where ku is an anisotropy constant, V is a volume of switching unit, k is the Boltzmann's constant, and T is the absolute temperature. It is experientially said that when the Ku·V/kT is less than 100, magnetization reversal due to thermal fluctuation occurs. Magnetic anisotropic energy, which is required to keep the magnetization orientation of a magnetic particle to be in one direction, is expressed as the product of magnetic anisotropic energy density Ku and the volume V of the magnetic particle. If a value of the Magnetic anisotropic energy is as large as a value of the thermal fluctuation energy, the magnetization fluctuates with time and the phenomenon occurs that recorded information is lost.

In a longitudinal magnetic recording type of magnetic recording medium, since the demagnetized field in recording bits in high recording density areas is strong, it is more likely to be affected by the thermal fluctuation even if the magnetic particle size is relatively large. On the other hand, in a perpendicular magnetic recording type of magnetic recording medium, by growing magnetic particles in the film thickness direction, a volume of switching unit V can be made large as the particle size on the medium surface becomes smaller, and thus the influence of thermal fluctuation can be suppressed. However, as high density of a magnetic medium is further promoted from now on, the thermal fluctuation resistance becomes limited even with the perpendicular magnetic recording type.

As a medium for solving the problem of the thermal fluctuation resistance, a magnetic recording medium called a "patterned media" is drawing attention. The patterned media usually means a magnetic recording medium having a plurality of magnetic areas, which are to become recording bit units, and which are respectively formed independently from each other in a non-magnetic-material layer. In other words, the patterned media can be said to be a medium having a magnetically-continuous magnetic thin film divided into the size of the recording magnetic domain. In a usual patterned media, oxide such as $SiO_2$, $Al_2O_3$, or $TiO_2$, nitride such as $Si_3N_4$, AlN, or TiN, carbide such as TiC, or a boric compound such as BN is used as the non-magnetic substance layer, and in this non-magnetic-substance layer, ferromagnetic material areas are formed selectively.

Because the patterned media is a magnetic thin film divided into the size of the recording magnetic domain, the magnetization minimum unit volume V can be enlarged, and thus the problem of thermal fluctuation can be avoided. In a conventional continuous magnetic thin film, the number of magnetic particles used is allowed up to about 1000 grains per bit. However, the number of grains corresponding to 1-bit decreases as the recording density becomes higher. Since recording mark edges are determined by the grain boundaries, the grains need to be as small as possible in order to ensure S/N. Accordingly, in the conventional continuous magnetic film, V is forced to be smaller. On the other hand, in the patterned media, the edges of recording magnetic domains can be defined structurally. Therefore, the improvement of S/N can be expected without making the V smaller.

In the patterned media, because the ferromagnetic areas, serving as recording bit units, are respectively formed independently from each other, interference between recording bits can be prevented. This structure works for suppressing the record loss and noise generated due to adjacent bits. Furthermore, domain wall displacement resistance increases by patterning, thereby making it possible to improve the magnetic characteristic.

As described above, because the patterned media can suppress the magnetization inversion due to the thermal fluctuation, it is effective as a high-density magnetic recording medium, but the manufacturing process is more complex than the other magnetic recording media.

FIGS. 1A to 1E show a general manufacturing method of the patterned media used conventionally. According to the conventional producing method, first a ferromagnetic thin film layer 120 including ferromagnetic-materials, such as Fe, Co, Ni, etc., is formed on a substrate 110 (FIG. 1A), and the ferromagnetic thin film layer 120 is etched by ion-milling using a resist pattern 130 as a mask (FIG. 1B), and an independent pattern is formed for each recording bit (FIG. 1C). Further, the surface is coated with a non-magnetic layer 140 (FIG. 1D), and finally the surface is polished so as to expose a ferromagnetic pattern (FIG. 1E).

Note that as shown in FIG. 1B, because the ferromagnetic thin film layer 120 is made of a material to which etching is difficult to apply. Therefore, chemical etching using Reactive Ion Etching (RIE), etc., which is widely used in semiconductor processes, is difficult to be used, and thus, physical etching such as ion beam-milling is used instead.

However, because ions accelerated by an electric field are sputtered onto the sample surface, the ion beam-milling damages the processed surface. This damage may cause noise during reproducing and recording. Therefore, in order to improve the magnetic characteristic, the development of a manufacturing method causing no damage is desired. Furthermore, there is a problem that manufacturing costs are great due to many process steps, and thus the development of a simpler manufacturing method is desired.

On the other hand, a single magnetic pole head is employed as a writing/reading head suitable for the perpendicular magnetic recording type of magnetic recording medium. Also in the case of the perpendicular magnetic recording type of patterned media, this single magnetic pole head is preferably used during writing and reading. Although it is possible to write into very small areas with the single magnetic pole head having the magnetic pole made smaller to converge leak magnetic fields, a magnetic loop from the head to the medium and back to the head needs to be formed and magnetic flux needs to be guided efficiently through the coils of the head. Therefore, when using the single magnetic pole head, a soft magnetic layer, which is to be a path for the magnetic flux, is preferably arranged, as the base of a magnetic recording layer in order to form the magnetic loop.

Therefore, when considering the structure and a method of manufacturing of the perpendicular magnetic recording type of patterned media, it is preferable to have a structure where a soft magnetic layer which is to be a path for the magnetic flux is arranged between a recording layer and a non-magnetic substrate, requiring a method for manufacturing such a structure. However, if the domain walls occur in the soft magnetic layer, they will cause noise during writing and reading.

SUMMARY OF THE INVENTION

An object of the present invention is to provide a perpendicular magnetic recording type of patterned media low in noise and capable of writing/reading with a single magnetic pole head and a method for manufacture thereof.

A magnetic recording medium according to a first aspect of the present invention includes a non-magnetic substrate; a soft magnetic layer formed on the non-magnetic substrate and including a plurality of projected parts and recessed parts surrounding each projected part; and a ferromagnetic layer formed on the soft magnetic layer. The ferromagnetic layer includes projected parts and recessed parts reflecting the projected parts and the recessed parts of the soft magnetic layer. Recording areas having perpendicular magnetic anisotropy and ferromagnetism are formed of the projected parts of the ferromagnetic layer and are separated magnetically from their surroundings.

A magnetic recording medium according to a second aspect of the present invention includes a non-magnetic substrate including a plurality of projected parts arranged regularly on the surface thereof and recessed parts surrounding each projected part; and a magnetic layer which is formed on the non-magnetic substrate. The magnetic layer includes a plurality of projected parts and recessed parts reflecting the projected parts and the recessed parts of the non-magnetic substrate. Recording areas having perpendicular magnetic anisotropy and ferromagnetism are formed of the projected parts of the magnetic layer, and are separated magnetically from their surroundings. Also non-recording areas having soft magnetism are formed of the magnetic layer excepting the recording areas.

A method for manufacture of a magnetic recording medium, according to a third aspect of the present invention includes forming a soft magnetic layer having a plurality of projected parts arranged regularly on the surface thereof and recessed parts surrounding each projected part; and forming a ferromagnetic layer having perpendicular magnetic anisotropy on the soft magnetic layer.

A method for manufacture of a magnetic recording medium, according to a fourth aspect of the present invention includes forming a non-magnetic substrate having a plurality of projected parts arranged regularly on the surface thereof and recessed parts surrounding each projected part; and forming an artificial lattice layer made of a ferromagnetic material having perpendicular magnetic anisotropy on the non-magnetic substrate.

DETAILED DESCRIPTION OF THE EMBODIMENTS

Preferred embodiments of the present invention will be described below with reference to the drawings.

First Embodiment

A first embodiment relates to a magnetic recording medium and a method for manufacture thereof. In the magnetic recording medium, a soft magnetic layer and a ferromagnetic layer of perpendicular magnetic anisotropy are serially laminated on a non-magnetic substrate having a plurality of projected parts arranged regularly and recessed parts surrounding each projected part on the surface thereof, in which the substrate is made by an injection molding method. According to the structure of this magnetic recording medium, projected parts and recessed parts reflecting the shape of the non-magnetic substrate are formed also on the soft magnetic layer and the ferromagnetic layer, and the so-called patterned media in which the projected parts of the ferromagnetic layer are specified only as recording areas.

Note that in the present invention, the ferromagnetic layer means a layer capable of having ferromagnetism according to the state of the laminated structure, etc., and the soft magnetic layer means a layer having soft magnetism.

The structure of the magnetic recording medium, and the manufacturing method, of the first embodiment will be described specifically below.

Figure 2A:
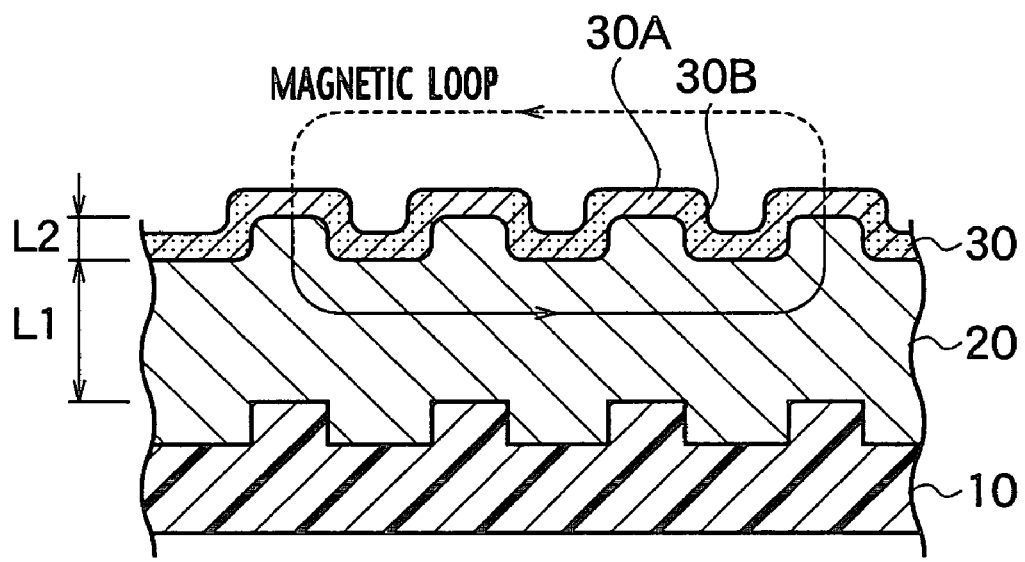
FIGS. 2A and 2B are cross-sectional views showing a magnetic recording medium according to a first embodiment of the present invention.
Figure 3A:
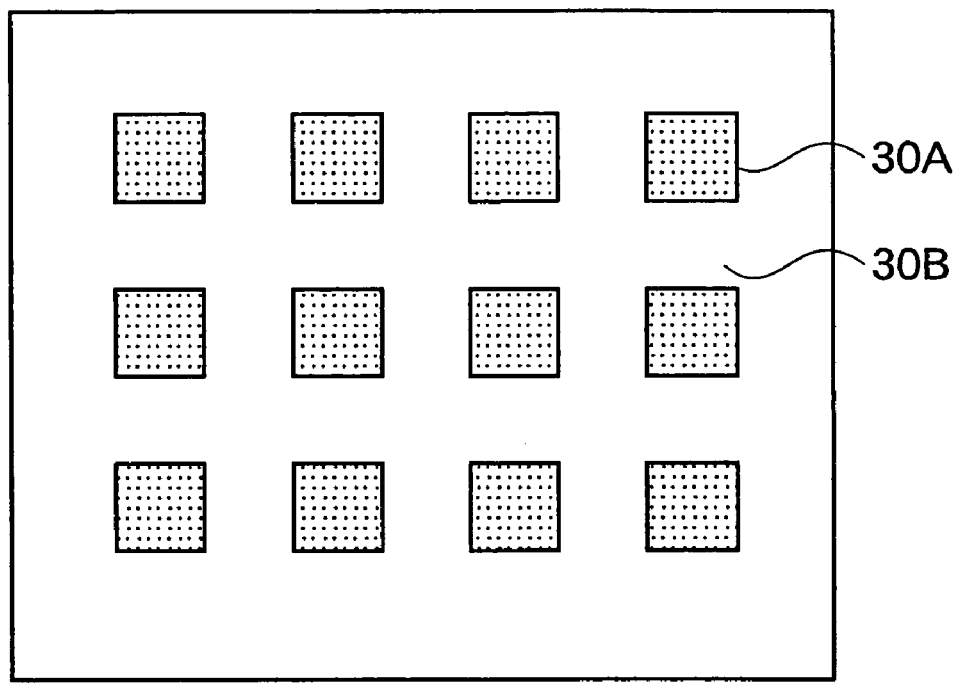
FIGS. 3A and 3B are plan views of the magnetic recording medium according to the first embodiment of the present invention.
Figure 3B:
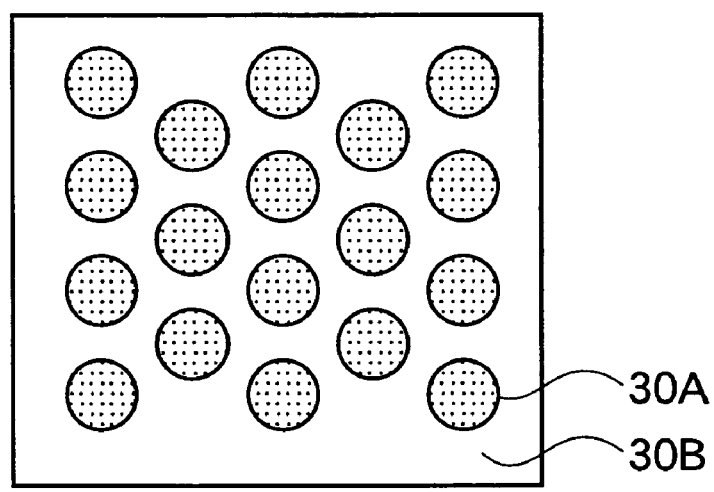

FIG. 2A is a cross-sectional view showing the structure of the magnetic recording medium according to the first embodiment, and FIGS. 3A and 3B are plan views thereof.

As shown in FIG. 2A, in the magnetic recording medium according to the first embodiment, a soft magnetic layer 20 and a ferromagnetic layer 30 having perpendicular magnetic anisotropy are serially laminated on a non-magnetic substrate 10 having a plurality of projected parts arranged regularly and recessed parts surrounding each projected part on the surface thereof. The soft magnetic layer 20 and the ferromagnetic layer 30 have projected parts and recessed parts reflecting recessed and projecting shapes of the non-magnetic substrate 10.

In this structure of the magnetic recording medium, since the ferromagnetic layer 30 covers the whole surface of the soft magnetic layer 20, recording bits are not physically isolated from one another. However, the projected and recessed shape loses magnetic interaction between the ferromagnetic layer 30 of the upper surface (referred to as simply projected parts hereafter) and the ferromagnetic layer 30 on sides and bottoms of the recessed parts (referred to as simply recessed parts hereafter). Accordingly, the projected part and the recessed parts are configured in a state of being magnetically isolated. That is, the structure functions as a so-called patterned media where only the projected parts of the ferromagnetic layer 30 serve as recording areas 30A which are intense in coercive force and the surrounding recesses of the ferromagnetic layer 30 serve as non-recording areas 30B. According to the structure of the magnetic recording medium of the first embodiment, without etching the ferromagnetic layer 30, a patterned media can be formed.

Note that in order to surely, magnetically divide the ferromagnetic layer formed on the projected parts, the film thickness of the ferromagnetic layer 30 is preferably set to be sufficiently thinner than a height of the projection parts (projection/recess height L2) of the soft magnetic layer 20. For example, the film thickness of the ferromagnetic layer 30 is preferably set to be ½ to ¼ of the projection/recess height L2 of the soft magnetic layer 20. For example, when a usual ferromagnetic thin film is used as the ferromagnetic layer 30 and the film thickness of the ferromagnetic layer 30 is 5 to 10 nm, the height of projected and recessed parts is preferably 10 to 20 nm or larger.

Moreover, the ferromagnetic layer 30 is preferably formed by a multi-layer film having cobalt (Co), platinum (Pt) and the like laminated alternately, that is, in a multi-layers. Since the characteristics of the multilayers depend on the state of the interfaces between the layers, a well-ordered laminated interface is not obtained on the ferromagnetic layer 30 of the side face of the projected and recessed parts, thereby dramatically degrading the magnetic characteristics. Therefore, the ferromagnetic recording areas 30A, having an intense coercive force of the projected part is magnetically divided by the existence of the ferromagnetic layer 30 of the side face which shows no ferromagnetism due to the degradation. Thus, the patterned media can be more easily and surely formed by using the artificial lattice.

Note that by making the area of the upper surface of the projected part smaller, the state of a single magnetic domain which does not interact with adjacent bits and which has a uniform magnetization orientation can be achieved. For example, in order to make each recording area 30A be in the single magnetic domain state, each recording area 30 is preferably set to 100 nm or less, more preferably set to 80 nm or less.

It is satisfactory that the recording areas 30A, which are the projected areas, are surrounded by recesses and arranged regularly, and the shape of a plan view of the recording areas 30A is not limited. As shown in FIG. 3A, any shape can be taken, such as a rectangular, a circle as shown in FIG. 3B, and an ellipse. Various array forms of the recording areas 30A are possible such as a tetragonal lattice as shown in FIG. 3A or a hexagonal lattice as shown in FIG. 3B.

On the other hand, because the magnetic recording medium according to the first embodiment has the soft magnetic layer 20 under the ferromagnetic layer 30, during recording and reproducing by use of the single magnetic pole head, a closed magnetic loop can be formed between the head and the medium.

Note that in a magnetic recording medium having a soft magnetic layer, if domain walls occur in the soft magnetic layer, they will become a major cause of noise during recording and reproducing. In order to prevent the occurrence of domain walls in the soft magnetic layer, the magnetism orientation is preferably arranged in a constant direction, that is, arranged in an in-plane radial direction in a disk-type perpendicular magnetic recording medium, for example. The projected parts and the recessed parts of the soft magnetic layer serve as a site pining for domain walls, to thereby produce the condition where domain walls are prone to be generated. The domain walls become the cause of spike noise and therefore not desirable. On the other hand, in the magnetic recording medium according to the first embodiment, the generation of domain walls can be suppressed by setting the thickness L1 of the magnetic layer 20 to be sufficiently thick, preferably set to at least twice or more the height L2 of the recessed and projected parts on the surface. Therefore, during writing and reading by use of the single magnetic pole head, it is possible to obtain the magnetism orientation arranged in an in-plane direction of the soft magnetic layer 20, and the closed magnetic loop is formed between the head (not shown) and the medium as shown in FIG. 2A, thereby enabling satisfactory high-density perpendicular magnetic recording.

The material used for each layer will be described below.

As the material of the non-magnetic substrate 10, the material suitable for the injection molding is preferably used. For example, thermoplastic resin is mentioned as the material. As thermoplastic resin, polycarbonate, polystyrene, styrene-based polymer alloy, acrylic resin (e.g. polymethyl-methacrylate-based), polyvinyl chloride, polyester, nylon, ethylene-vinyl acetate resin, amorphous polyolefin, and the like can be listed. Thermosetting resin can also be used other than above materials. In addition, epoxy resin, thermosetting polyurethane, unsaturated acrylic resin, unsaturated polyester, diethylene-glycol-bisallyl-carbonate resin, and the like are listed as the thermosetting resin. Furthermore, instead of resin, glass, especially low-melting glass can also be used. Polycarbonate is preferable in terms of high productivity, cost, moisture absorption resistance, etc. Amorphous polyolefin is preferable in terms of resistance to chemicals, moisture absorption resistance, etc.

It is satisfactory that the soft magnetic layer 20 has a range of coercive force so that the magnetism orientation (spin orientation) is changed by the magnetic field of the single magnetic pole head during writing and reading, and the closed magnetic loop is formed. Generally, the force is set to preferably several kOe or less, more preferably set to 1 kOe or less, even more preferably set to 50 Oe or less.

For example, as the soft magnetic layer 20, soft magnetic materials are mixed with any of the elements such as Fe, Ni, and Co in the composition, that is, such as CoFe, NiFe, CoZrNb, ferrite, silicon-iron, carbon-iron, and the like.

A microstructure of the soft magnetic layer 20 is preferable in terms of clystallinity and microstructure control if constituted similarly to the ferromagnetic layer 30. However, when giving priority to the magnetic characteristic, another structure can daringly be adopted. For example, the amorphous soft magnetic layer 20 can be combined with the crystalline ferromagnetic layer 30 or the converse can be considered. Moreover, the soft magnetic layer 20 may have a so-called granular structure where soft magnetic material particles exist in a non-magnetic matrix, or may be made up of a plurality of layers of different magnetic characteristics such as a multi-layer film of a soft magnetic layer and a non-magnetic layer.

Note that the orientation of the magnetic anisotropy of the soft magnetic layer 20, excepting during writing and reading, may be perpendicular to the film surface, in an in-plane circumferential direction, in an in-plane radial direction, or a combination of these.

As the ferromagnetic layer 30, a ferromagnetic material usually used in magnetic recording media at present, is used. That is, materials whose saturated magnetization Is and magnetic anisotropy are large are suitable. From this point of view, at least any one of Co, Pt, Sm, Fe, Ni, Cr, Mn, Bi, Al, and at least any one of the group consisting of the alloys of these metals, can be used. Among these metals, Co-alloy large in crystal magnetic anisotropy, especially an alloy having CoPt, SmCo, or CoCr as the base, or a regular alloy such as FePt or CoPt is preferable. Specifically, Co—Cr, Co—Pt, Co—Cr—Ta, Co—Cr—Pt, Co—Cr—Ta—Pt, $Fe_{50}Pt_{50}$, $Co_{50}Pt_{50}$, $Fe_{50}Pd_{50}$, $Co_{75}Pt_{25}$, etc are preferable. Furthermore, other than these alloys, a material can be selected from a rare-earth/transition-metal alloy such as Tb—Fe, Tb—Fe—Co, Tb—Co, Gd—Tb—Fe—Co, Gd—Dy—Fe—Co, Nd—Fe—Co, or Nd—Tb—Fe—Co, a multi-layer film of a magnetic layer and a precious metal layer (multilayers such as Co/Pt or Co/Pd), a semimetal such as PtMnSb, a magnetic oxide such as Co-ferrite or Ba-ferrite.

In order to control the magnetic characteristic of the ferromagnetic layer 30, an alloy of the above magnetic substance and at least any one or more element of Fe and Ni, which are magnetic elements, may be used as the ferromagnetic layer 30. Furthermore, additives for improving the magnetic characteristic may be added to these metals and alloys. Specifically, additives such as Cr, Nb, V, Ta, Mo, Ti, W, Hf, Cr, In, Zn, Al, Mg, Si, B, or a compound of these elements and at least any one element of oxygen, nitrogen, carbon, and hydrogen are preferable.

As for the magnetic anisotropy of the ferromagnetic layer 30, as long as a perpendicular magnetic anisotropy component is major, an in-plane magnetic anisotropy component is allowed to exist. While the thickness of the ferromagnetic layer 30 is not especially limited, the thickness is preferably set to 100 nm or less when high density recording is taken into consideration, more preferably set to 50 nm or less, even more preferably set to 20 nm or less. Note that, when the thickness is 0.1 nm or less, it is difficult to form a continuous thin film, and therefore it is not preferable. Meanwhile, in order to magnetically divide recording areas formed of projected parts and recessed parts, the thickness of the ferromagnetic layer is preferably thin, and the height of the recessed and projected parts are preferably large.

Moreover, the ferromagnetic layer 30 is preferably a composite material made of magnetic particles and non-magnetic substances which exist therebetween. This is because high density magnetic recording is possible with specifying magnetic particles as inversion units. However, when recording areas are patterned, non-magnetic substances are not necessarily needed, and it may be a continuous, amorphous magnetic substance such as a rare-earth/transition-metal alloy.

The method of manufacturing a magnetic recording medium according to the first embodiment will be described below with reference to FIGS. 4A to 4C.

Figure 4A:
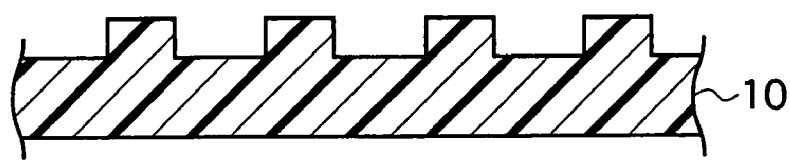
FIGS. 4A to 4C are cross-sectional views showing steps of a method for manufacture of the magnetic recording medium according to the first embodiment of the present invention.

First, as shown in FIG. 4A, the non-magnetic substrate 10 having a plurality of projected parts arranged regularly and recessed parts surrounding each projected part on the surface thereof is formed by an injection molding. Specifically, an injection-moldable material such as a thermoplastic resin is used as the material of the non-magnetic substrate 10, then, molten resin is poured into a mold having a recessed and projected pattern formed thereon, and after cooling, it is taken out of the mold. When forming a drum-type magnetic recording medium, a cylinder-type mold is used, and a cylindrical non-magnetic substrate 10 having fine projected parts and recessed parts formed on the outer surface is formed. Note that the height of the projected and recessed parts formed on the non-magnetic substrate 10 is set to e.g. 10 nm or larger, preferably set to 20 to 100 nm, and the dimension of the upper surface of the projected part is set to 100 nm square or less, preferably 80 nm square or less. In order to magnetically divide, the height of the recessed and projected parts is preferably equal or more to the length of one side of the rectangle of the upper surface of the projected part. However, when the aspect ratio of the projected parts becomes large, processing becomes difficult. Therefore, practically, the length of one side of the rectangle of the upper surface of the projected part is preferably set to equal to the height of the recessed and projected parts. For example, in the case where the upper surface of the projected part is 100 nm square, the height of the recessed and projected parts is set to 100 nm, and in the case of 40 nm square, the projection/recess height is set to 50 nm.

The mold used for injection-molding having fine projected parts and recessed parts can be formed in the following manner. That is, a resist film is coated over a Si substrate or a resin cylinder, and a resist pattern is formed by EB (Electron Beam) exposure or FIB (Focused Ion Beam) processing; using the resist pattern as a mask, recess/projection pattern is formed on the surface of the substrate by Ar-ion milling using the resist pattern as a mask, and further by sputtering Ni, etc., the surface is made conductive and the mold thereof is obtained by Ni-electroforming.

However, because these pattern forming methods requires cost and time extremely, instead of the method of patterning a resist with EB exposure, a pattern intended to be the base of the mold is preferably formed using a method of forming a pattern of fine dots arranged regularly on a substrate by using the self-organizing function of block copolymer. By controlling the molecular weight, di-block polymer can easily form various arrangement structures of various sizes, and thus, is advantageous in terms of producing molds.

Figure 4B:
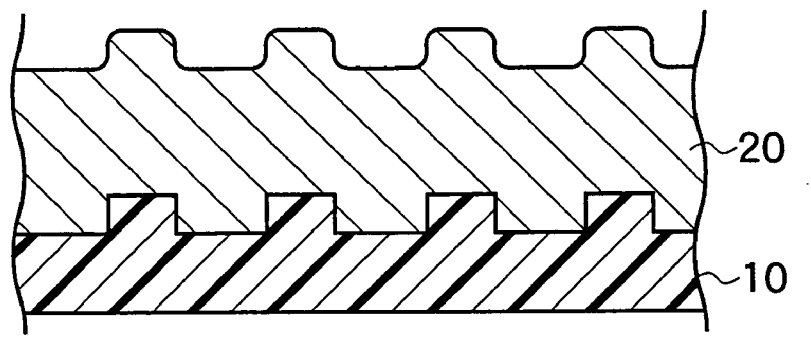

Next, as shown in FIG. 4B, the soft magnetic layer 20 is formed by use of a sputtering method on the non-magnetic substrate 10 formed by injection molding.

Figure 4C:
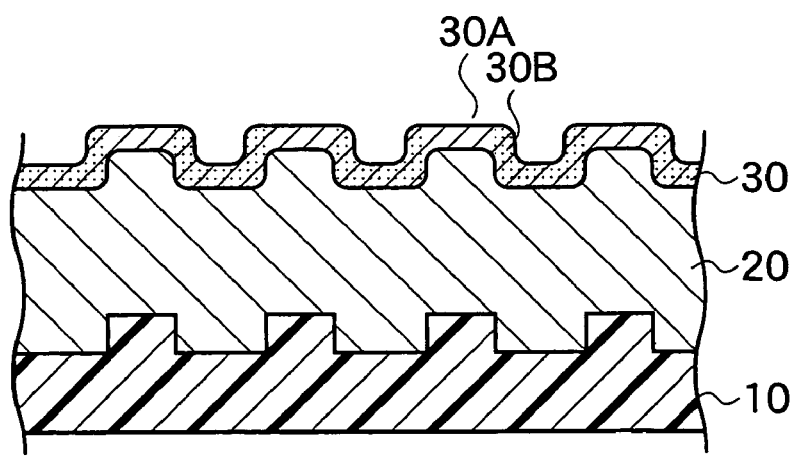

Next, as shown in FIG. 4C, the ferromagnetic layer 30 is formed on the soft magnetic layer 20 having recesses and projections. Note that multilayers are preferably formed as a ferromagnetic layer 30.

In the above process, since the projected parts and recessed parts of the soft magnetic layer 20 are coated with the ferromagnetic layer 30, recording bits are not physically isolated. However, the ferromagnetic layer 30 of the projected part is magnetically separated from the ferromagnetic layer 30 of the surrounding recessed part to form the recording areas 30A having a large coercive force at the projected part only. In this manner, the so-called patterned media can be obtained.

According the manufacturing method of the magnetic recording medium of the first embodiment as described above, because non-magnetic substrates, having projected parts and recessed parts, are manufactured by the injection molding method, it is suitable for mass-production. Furthermore, because an etching process required for the conventional patterned media, is not necessary and a CMP process can also be omitted, and accordingly, the process can be widely simplified. Moreover, because an etching process is not necessary, the processing surface is free of any damage due to physical etching such as ion-milling. Noise due to etching damage does not occur, thereby improving the magnetic characteristic.

Figure 2B:
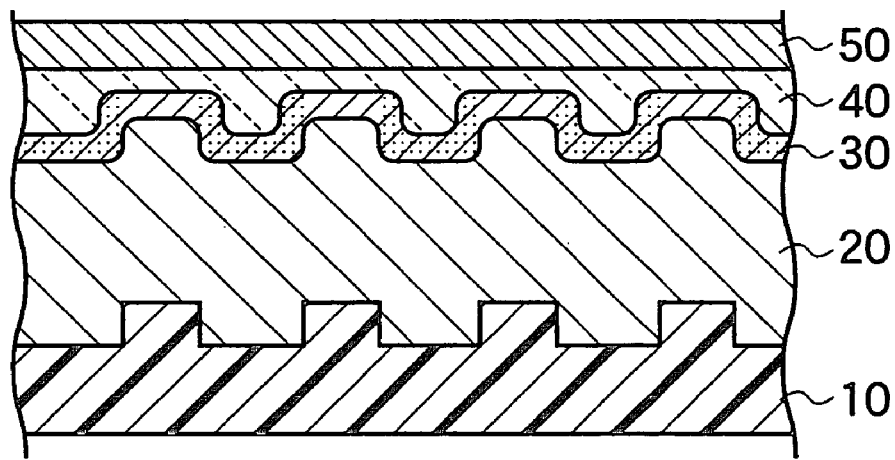

Note that as shown in FIG. 2B, in the magnetic recording medium, a nonmagnetic film 40 is formed on the ferromagnetic layer 30; the surface of the medium is flattened; and a protection film 50 is formed thereon. The flattening process is necessary since in R/W evaluation (read/write evaluation), HDI (Head Disk Interface) is important. Oxide such as $SiO_2$, $Al_2O_3$, or $TiO_2$, nitride such as $Si_3N_4$, AlN, or TiN, carbide such as TiC, or a boric compound such as BN can be used as the non-magnetic film 40 for flattening. Note that since it is difficult to fill the above-described non-magnetic film, in order to flatten the fine recesses and projections of nanometer level. A spin-coat method using SOG (Spin on Glass) is suitable for flattening. Since SOG is a liquid agent obtained by glass material dissolved in a solvent, and therefore, fills fine recesses on the substrate by spin-coating to flatten the surface uniformly. In addition, the solvent vaporizes several seconds after spin-coating to solidify. The SOG may be used as it is, but is preferably transformed into stable $SiO_2$ by applying heat treatment at a temperature of 450° C. or more.

An example according to the first embodiment will be described below.

EXAMPLE 1

First, a cylindrical non-magnetic substrate 10 provided with projected parts and recessed parts was formed by an injection molding. A mold used for the injection molding was the one having a plurality of rectangular projected parts arranged regularly on the surface as shown in FIG. 3A. This injection molding mold was formed by patterning a barrel-shaped cylinder by using an EB exposure method to obtain the mold thereof by Ni-electroforming. The upper surface of the rectangular projected part was set to 50 nm, and the height of the recesses and projections was set to 50 nm.

Specifically, polycarbonate material was prepared as the non-magnetic substrate, and poured to a hopper of an injection molding machine. Then, injection molding was performed under conditions of the temperature of the mold at 125° C., the temperature of resin at 340° C., injection pressure at 30 t, and cycle time at 12 seconds. In this way, a barrel-shaped polycarbonate cylinder with a size of 200 nm in diameter, and 700 nm in height, and which is expected to be a non-magnetic substrate 10 having recesses and projections on the surface thereof, was manufactured.

Next, a CoZrNb film of 200 nm in thickness, which is the soft magnetic layer 20, was deposited by using a sputtering method applied on the surface of this barrel-shaped polycarbonate cylinder. Since the recesses/projections height L2 formed on the soft magnetic layer 20 is at least slightly less than the recesses/projections height 50 nm of the non-magnetic substrate. Therefore, in this condition, the condition that the thickness L1 of the soft magnetic layer 20 should be twice or more the recesses/projections height L2, was sufficiently satisfied.

Subsequently, as the ferromagnetic layer 30, multilayers where Co and Pd films were laminated alternately was formed by a sputtering method. The thickness of the Co and Pd films were set to 0.3 nm and 0.7 nm respectively, and the number of the layers was set to ten. When this kind of multilayers were formed directly on a flat polycarbonate substrate without forming the soft magnetic layer, squareness ratio was 0.8, and the coercive force was 2500 Oe, which were shown as magnetic characteristics.

A SOG layer was formed on the ferromagnetic layer 30 to flatten the surface, and a C-protection film of 10 nm in thickness was further formed by a sputtering method.

The magnetic recording medium obtained in this way was vanished under conditions of contact pressure of about 5 to 6 g, disc rotation speed of 3000 rpm, slide speed of 1.25 mm/s, and five reciprocating motions, to the extent that a pulsed signal seemingly generated from the projected part goes out. In this way, R/W test was conducted. When write-in was performed at a frequency of 1 MHz and with 40 mA, a reproduction signal of about 300 mV at the output of a pre-amplifier was obtained without occurrence of spike noise.

EXAMPLE 2

In example 2, a non-magnetic substrate was formed by an injection molding method using a mold having fine pattern formed thereon by use of the self-organizing function of di-block polymer. Other than the non-magnetic substrate, a magnetic recording medium was formed under the same conditions as in example 1.

That is, a liquid agent mixed with PS-PMMA di-block copolymer (PS: polystyrene; PMMA: poly-methyl-methacrylate) was coated over a barrel-shaped cylinder to obtain a sea-islands structure in which island-like regions made of PMMA and a sea-like region made of PS are separated in a phase. These regions are exposed to ozone to vaporize PS selectively, to obtain a regular dot pattern of PMMA. Thereafter, ion-milling was performed using the dot pattern of PMMA as a mask; Ni is coated by sputtering over the surface of the barrel-shaped cylinder having recesses/projections formed thereon by etching; a conduction treatment is carried out thereon; and further an injection molding mold was formed by Ni-electroforming.

Polycarbonate was injection-molded, and a pattern having projected parts of about 40 nm in diameter arranged at 80-nm pitches to be like a hexagonal lattice as shown in FIG. 3B, was formed on the non-magnetic substrate 10, with the height of the projected parts being 50 nm.

Next, a CoZrNb film of 200 nm in thickness, which is a soft magnetic layer, was deposited on the non-magnetic substrate by using the sputtering method like in example 1.

Subsequently, multilayers where Co and Pd films were laminated alternately was formed by the sputtering method as the ferromagnetic layer 30. The thickness of the Co and Pd films were set to 0.3 nm and 0.7 nm respectively, and the number of the layers was set to ten.

The magnetic recording medium obtained in this way was vanished under conditions of contact pressure of about 5 to 6 g, disc rotation speed of 3000 rpm, slide speed of 1.25 mm/s, and five reciprocating motions, to the extent that a pulsed signal seemingly generated from the projected part goes out, and R/W test was conducted. When write-in was performed at a frequency of 1 MHz and with 40 mA, the reproduction signal of about 300 mV at the output of a pre-amplifier was obtained without the occurrence of spike noise.

In the magnetic characteristic of the magnetic recording media, hardly any difference can be recognized between example 1 where an injection molding mold formed using EB exposure, which is a high cost process, was used and example 2 where an injection molding mold formed using the self-organizing function of di-block polymer, which is a low cost process, was used.

EXAMPLE 3

In example 3, a magnetic recording media in which the film thickness of the soft magnetic layer was set to be thinner than that of examples 1 and 2 was formed. Other than the film thickness of the soft magnetic layer, basic conditions were made same as in example 2.

First, a pattern having projected parts of about 40 nm in diameter arranged at 80-nm pitches uniformly as shown in FIG. 3B was formed on a polycarbonate substrate using a injection molding mold formed by use of the patterning method using the self-organizing function of di-block polymer similarly to example 2. The recesses/projections height formed on the polycarbonate substrate, which is a non magnetic substrate 10, was 50 nm.

Next, a CoZrNb film of 80 nm in thickness, which is a soft magnetic layer, was formed on this soft magnetic layer by a sputtering method. That is, the condition is made such that the thickness L1 of the soft magnetic layer is thinner than the value twice the height L2 of the recesses/projections height on the soft magnetic layer.

Subsequently, as the ferromagnetic layer 30, multilayers where Co and Pd films were laminated alternately was formed by the sputtering method. The thickness of the Co and Pd films were set to 0.3 nm and 0.7 nm respectively, and the number of the layers was set to ten. SOG was coated by spin-coat from the above to flatten the surface, and then a C-protection film of 10 nm in thickness was formed by sputtering.

The magnetic recording medium obtained in this way was vanished under conditions of contact pressure of about 5 to 6 g, disc rotation speed of 3000 rpm, slide speed of 1.25 mm/s, and five reciprocating motions, to the extent that a pulsed signal seemingly generated from the projected part goes out, and R/W test was conducted. When write-in was performed at a frequency of 1 MHz and with 40 mA, it was confirmed that the reproduction signal was obtained. Note that in this example, little spike noise was observed and the reproduction signal was deteriorated compared with examples 1 and 2.

When observing the magnetic patterns of the magnetic recording medium subjected to R/W evaluation by use of Magnetic Force Microscope (MFM), a pattern seemingly generated due to a domain wall of the CoZrNb film, which is a soft magnetic layer, was observed. This domain wall seems to cause spike noise. The domain wall occurs because the soft magnetic layer is so thin that the projected parts and the recessed parts become a pining site of the domain wall. From this result, in order to obtain a clear reproduction signal, the thickness L1 of the soft magnetic layer is at least twice the recesses/projections height L2 of the soft magnetic layer.

COMPARATIVE EXAMPLE

In a comparative example, a magnetic recording medium was formed by using a manufacturing method of a patterned media using the ion-milling etching method used conventionally shown in FIGS. 5A to 5E.

Figure 5A:
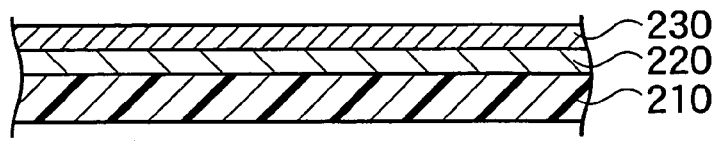
FIGS. 5A to 5E are cross-sectional views showing steps of a method for manufacture of the magnetic recording medium of a comparative example in the first embodiment of the present invention.

Specifically, a CoZrNb film of about 200 nm in thickness was formed as a soft magnetic layer 220 by a sputtering method on a flat polycarbonate substrate 210 as shown in FIG. 5A. Subsequently, multilayers where Co and Pd films were laminated alternately were formed by the sputtering method as a ferromagnetic layer 230 on the soft magnetic layer 220. The thickness of the Co and Pd films were set to 0.3 nm and 0.7 nm respectively, and the number of the layers was set to ten.

Figure 5B:
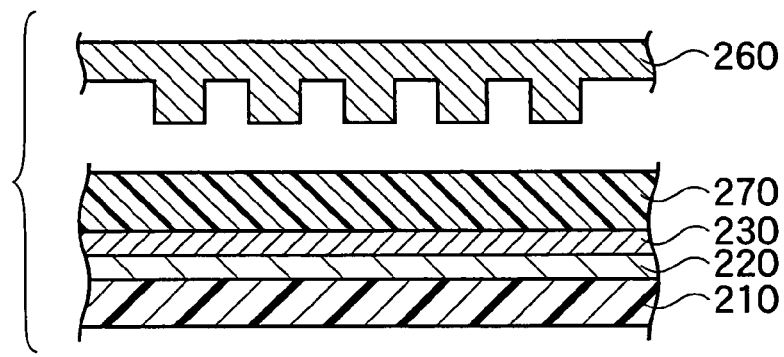
Figure 5C:
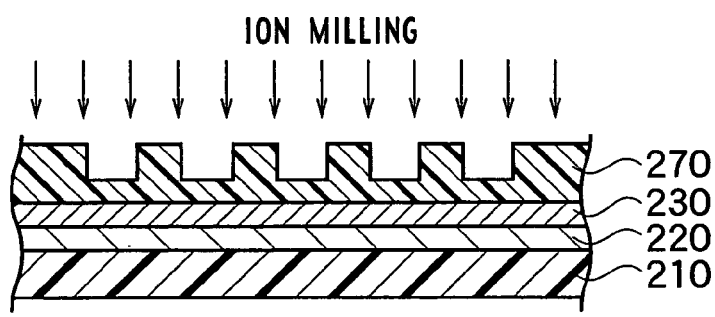
Figure 5D:
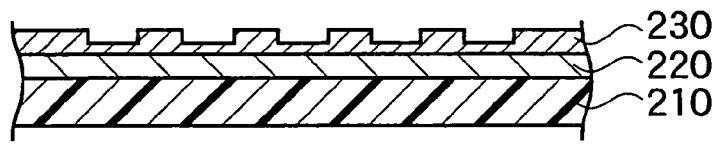

As shown in FIG. 5B, a photoresist 270 was coated thereon by about 150 nm in film thickness by use of a spin-coat method, and a nano-imprint mold is performed thereon using a Ni stamper formed in the same way as the injection-molding mold used in example 2, to form projected parts and recessed parts on the photoresist 270. Thereafter, as shown in FIG. 5C, the surface was etched by Ar-ion milling using the photoresist 270 as a mask. The remaining resist layer was removed by oxygen plasma to obtain the ferromagnetic layer 230 having projected parts and recessed parts as shown in FIG. 5D.

Next, when observing the surface by use of SEM (Scanning Electron Microscope), a lot of cracks like crevasses were observed on the soft magnetic layer. Furthermore, in observing of magnetic patterns by use of MFM, a pattern seemingly generated due to a domain wall was observed in the soft magnetic layer.

Figure 5E:
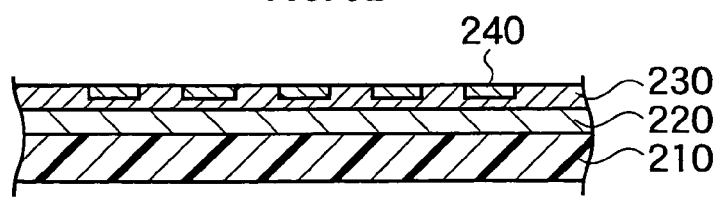

Subsequently, as shown in FIG. 5E, 50G was spin-coated on the ferromagnetic layer 230, and the surface was flattened by CMP processing, and then a carbon (C) protection film of 10 nm in thickness was formed by sputtering.

R/W test was conducted. When write-in was performed at a frequency of 1 MHz and with 40 mA, no clear reproduction signal was obtained due to a large noise. A lot of spike noises were also observed. This is caused by damage due to the ion-milling process. It is considered that since the collision energy of Ar-ions by ion-milling is intense, the soft magnetic layer as well as the ferromagnetic layer was damaged, to generate cracks. These cracks had seemingly caused the occurrence of domain walls, causing large spike noises and no clear reproduction signal was obtained.

As described above, when example 1 and example 2 are compared, it is clarified that etching damage is involved in a patterned media of the comparative example formed by the manufacturing method used conventionally, in which the ferromagnetic layer is etched by ion-milling, thereby generating a large noise. It was confirmed that in order to obtain a perpendicular magnetic recording medium of high S/N, the structure of the magnetic recording medium requiring no etching process according to the present embodiment is preferable.

Second Embodiment

Figure 6:
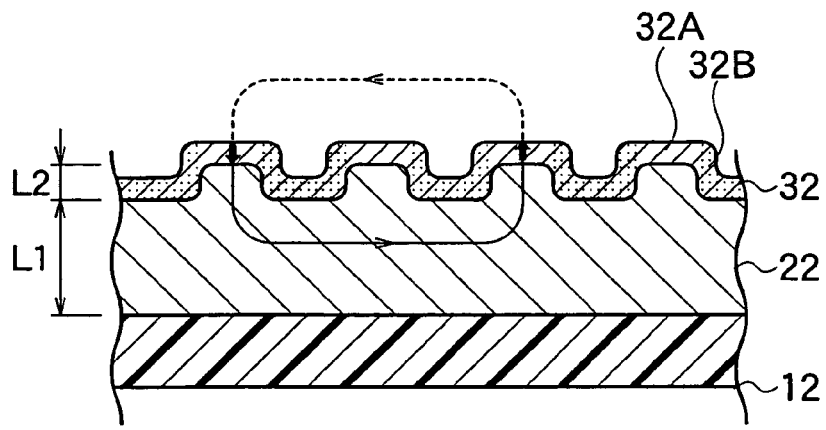
FIG. 6 is a cross-sectional view of a magnetic recording medium according to a second embodiment of the present invention.

FIG. 6 shows a cross-sectional structure of a magnetic recording medium according to a second embodiment of the present invention. This magnetic recording medium, as shown in the figure, is obtained by forming a plurality of projected parts arranged regularly and recesses surrounding each projected part on the surface on a soft magnetic layer 22 formed on a non-magnetic substrate 12 and then forming a ferromagnetic layer 32 having perpendicular magnetic anisotropy thereon.

According to the structure of this magnetic recording medium, projected parts and recessed parts reflecting the shape of the magnetic layer are formed also in the ferromagnetic layer, and the so-called patterned media is formed specifying only the projected part of the ferromagnetic layer as the perpendicular recording area. That is, the structure is different from that of the first embodiment in that the non-magnetic substrate has no recesses and projections but the soft magnetic layer has projected parts and recessed parts formed thereon. Note that conditions not especially explained are the same as those in the first embodiment.

In the structure of this magnetic recording medium, since the magnetic interactive force that acts between the projected part and the ferromagnetic layer 32 of recessed side part, and bottom, can be divided, a patterned media having independent recording areas 32A only in the projected parts can be formed. In plan view, the arrangement of the recording areas 32A takes a form of tetragonal lattice as shown in FIG. 3A or hexagonal lattice as shown in FIG. 3B similarly to the first embodiment.

According to the structure of this magnetic recording medium of the second embodiment, a patterned media can be formed without etching the ferromagnetic layer 32. The soft magnetic layer 22 prepared as a base layer of the ferromagnetic layer 32 becomes a path of a magnetic field during writing and reading by use of a single magnetic pole head, and thus a closed magnetic loop can be formed between the head (not shown) and the medium as shown in FIG. 6. Moreover, similarly to the first embodiment, the thickness L1 of the soft magnetic layer 22 is set to at least the thickness capable of arranging magnetism orientation stably in an in-plane direction, during writing and reading and preferably set to the thickness twice or more the recesses/projections height L2 on the surface of the soft magnetic layer. Thereby, the effects of the projected parts and recessed parts can be suppressed to prevent the occurrence of domain walls. Therefore, high-density perpendicular magnetic recording can be achieved.

Next, the manufacturing method of a magnetic recording medium according to the second embodiment will be described with reference to FIGS. 7A to 7C.

Figure 7A:
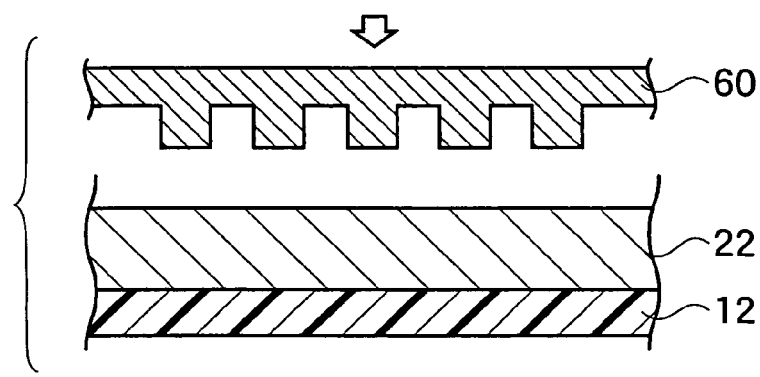
FIGS. 7A to 7C are cross-sectional views showing steps of a method for manufacture of the magnetic recording medium according to the second embodiment of the present invention.
Figure 7B:
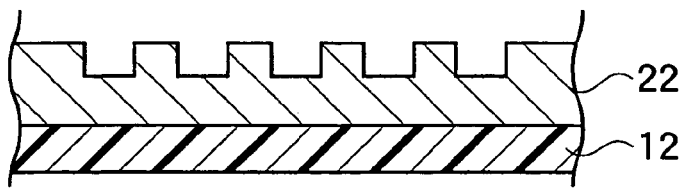

First, as shown in FIG. 7A, a soft magnetic layer 22 is deposited on a flat non magnetic substrate 12 by use of a sputtering method.

Subsequently, the soft magnetic layer 22 is press-molded (nano-imprinted) with a stamper 60, which is a hard mold having projected parts and the recessed parts. Diamond, DLC (Diamond-Like Carbon), SiC, oxide such as $SiO_2$, $Al_2O_3$, $TiO_2$, $Ta_2O_5$, $Cr_2O_3$, $ZrO_2$, or $CaO_2$ is preferable as a hard mold material. In this way, the projected parts and the recessed parts as shown in FIG. 7B are formed on the soft magnetic layer 22. These projected parts and the recessed parts are constituted by a plurality of projections arranged regularly and recesses surrounding each projection.

Note that the soft magnetic layer 22 is preferably a soft material exhibiting higher ductility and malleability so as to be subjected to nano-imprinting process. For example, Fe, multilayers of Fe/Pt, $Fe_3Pt_1$, or polymer layer with Fe, Ni and Co dispersed therein is suitable.

Note that the recesses/projections height formed on the soft magnetic layer 22 is e.g. 10 nm or more, preferably 20 to 100 nm, and the upper surface dimension of the projected parts are set to 100 nm square or less, preferably set to 80 nm square or less. In order to magnetically divide, the recesses/projections height is preferably equal or more to one side of the rectangle of the upper surface of the projected part. However, when the aspect ratio of the projected part becomes large, it becomes difficult to process. Therefore, practically one side of the rectangle of the upper surface of the projected part is preferably almost equal to the recesses/projections height. For example, when the upper surface of the projected part is 100 nm square, the recess/projection height is 100 nm, and when 40 nm square, the recess/projection height is 50 nm.

Figure 7C:
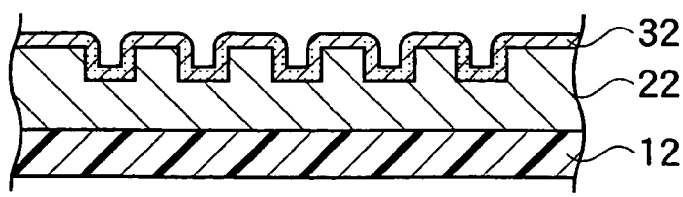

Next, as shown in FIG. 7C, a ferromagnetic layer 32 is formed on the soft magnetic layer 22 having the projected parts and the recessed parts formed thereon. The material of the ferromagnetic layer 32 can be made same as that of the magnetic recording medium according to the first embodiment.

According to the manufacturing method of the magnetic recording medium of the second embodiment as described above, etching processes such as ion-milling required for the conventional patterned media forming process, can be eliminated, and CMP process can also be omitted, thereby greatly simplifying the process. Furthermore, ion-milling can be eliminated, thereby being free of any damage on the processing surface due to physical etching, and thus the magnetic characteristic can be improved.

An example according to the second embodiment will be described below.

EXAMPLE 4

A nano-imprint mold is performed on a photoresist having the thickness of about 150 nm, which is formed on a SiC substrate by use of a Ni stamper, and thus, recess/projection pattern is formed on the photoresist. The Ni stamper is made by using a phase-separation of PS-PMMA di-block copolymer which is used in example 2. Next, the SiC substrate was etched by RIE using the photoresist as a mask to produce a SiC stamper.

Next, a flat Si substrate was prepared as a non-magnetic substrate, and a Fe film of about 300 nm in thickness was formed by a sputtering method as a soft magnetic layer on this Si substrate. The Fe film was directly nano-imprinted at a press pressure of 30 t using the SiC stamper. The transferred recess/projection height was 15 nm.

Subsequently, multilayers, in which a Co film and a Pd film were laminated ten times alternately by using sputtering method, was formed as the ferromagnetic layer 30. SOG was spin-coated thereon to flatten the surface, and then a C-protection film of 10 nm in thickness was formed by a sputtering method. In order to remove domain walls of Fe, the sample was introduced in a Helmholtz coil and magnetized at 15 kOe in a rotational direction of the disk.

Thereafter, R/W test was conducted. When write-in operation was performed at a frequency of 1 MHz and with 40 mA, the reproduction signal was about 200 mV at the output of a pre-amplifier, and no occurrence of spike noise was observed.

As described above, from the result of example 4, according to the magnetic recording medium of the second embodiment of the present invention, patterned media having a satisfactory R/W characteristic could be formed more easily.

Third Embodiment

Figure 8:
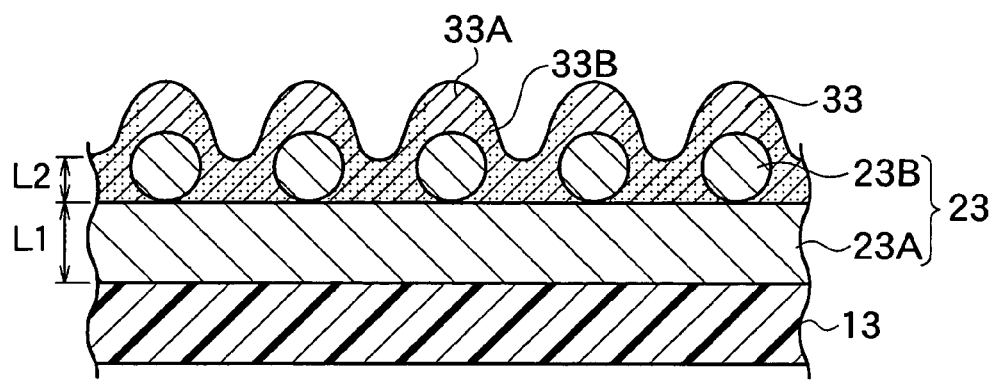
FIG. 8 is a cross-sectional view of a magnetic recording medium according to a third embodiment of the present invention.

FIG. 8 shows a cross-sectional structure of a magnetic recording medium according to a third embodiment of the present invention. This magnetic recording medium, as shown in the figure, has soft magnetic particles 23B, which has the same composition with the soft magnetic film 23A, arranged regularly on the flat, soft magnetic film 23A formed on a non-magnetic substrate 13, and the soft magnetic film 23A and the soft magnetic particles 23B are combined to constitute the soft magnetic layer 23 having projected and recessed parts thereon. Further, a ferromagnetic layer 33 having perpendicular magnetic anisotropy is formed on the soft magnetic layer 23.

In the structure of this magnetic recording medium, since the magnetic interactive force which acts between the ferromagnetic layer 33A and the ferromagnetic layer 33B can be divided, the patterned media can be obtained. Wherein, the ferromagnetic layer 33A is formed on the upper surface of the soft magnetic particles 23B corresponding to the projected part, and the ferromagnetic layer 33B is formed on the side face of the soft magnetic particles 23B corresponding to the side face and bottom of the projected part, and on an exposure surface of the soft magnetic film 23A.

The material of the soft magnetic film 23A and the ferromagnetic layer 33A can be made same with that of the magnetic recording medium according to the first embodiment. That is, as the soft magnetic film 23A, the soft magnetic material mixed with any one of the elements Fe, Ni, Co, as the composition, such as CoFe, NiFe, CoZrNb, ferrite, silicon-iron, or carbon-iron is preferably used. As the soft magnetic particle 23B, the material mixed with the same composition with the soft magnetic film 23A such as Fe, Co, or Ni is preferably used.

The soft magnetic particles 23B are formed by use of a de-carbonyl reaction method, a super halide reduction method, or the like. In the de-carbonyl reaction method, carbonyl salt as a precursor such as $Co_2(CO)_8$, $Fe(CO)_5$, or $Ni(CO)_4$ and trialkyl phosphin are mixed and heated at high temperature to obtain fine particles such as Co, Fe, or Ni by de-carbonyl reaction. In the super halide reduction method, trialkyl phosphin is added to chrolide salt as a precursor such as $FeCl_3$, $FeCl_2$, $CoCl_2$, or $NiCl_2$ and particles such as Co, Fe, or Ni are obtained by reduction of the chrolide. The contents of Journal of Applied Physics, Vol. 85, No. 8, pp. 4325–4330, 15 Apr. 1999 are incorporated herein by reference. The diameter R of the fine particles depends on the length of the molecule chain of trialkyl phosphin to be added. For example, the diameter R can be made smaller by shortening the alkyl chain. In this way, the value of the diameter R can be adjusted.

In order to form the magnetic recording medium of the third embodiment, after the soft magnetic film 23A is formed on the non-magnetic substrate 13 by sputtering or the like, a colloid solution having soft magnetic particles formed by the above method dispersed therein is spin-coated over the soft magnetic film 23A, to form a mono-layer. The soft magnetic particles are arranged on the soft magnetic film 23A regularly by self-organizing function. Further, the ferromagnetic layer 33 may be formed thereon by sputtering.

Note that in the magnetic recording medium of the third embodiment also, the film thickness L1 of the soft magnetic film 23A is preferably set to the thickness capable of arranging the magnetism orientation in the soft magnetic layer 23 during writing and reading, and more preferably set to twice or more the recess/projection height L2 of the soft magnetic layer 23, that is, set to twice or more the size of the soft magnetic particles 23B.

According to the manufacturing method of the magnetic recording medium of the third embodiment as described above, magnetic interactive force which acts between the ferromagnetic layer 33 covering the upper layer part of the soft magnetic particles 23B, and the ferromagnetic layer 33 covering the side face part of the soft magnetic particle 23B and the soft magnetic film 23A, can be divided by the recess/projection formed by the soft magnetic film 23A and the soft magnetic particles 23B arranged thereon. Therefore, the patterned media having the part covering the upper layer part of the soft magnetic particles 23B, that is, having an independent recording area 33A at the projected part of the ferromagnetic layer 33, can be formed. According to the above structure, the etching process such as ion-milling required for the conventional patterned media forming process, can be eliminated, and the CMP process can be omitted, thereby simplifying the process greatly. Moreover, because ion-milling is not necessary, the surface to be processed is free of any damage due to physical etching, thereby enabling the improvement of the magnetic characteristic. Moreover, because the occurrence of domain walls is prevented in the soft magnetic layer, high-density perpendicular magnetic recording can be achieved by use of a single magnetic pole head.

An example according to the third embodiment will be described below.

EXAMPLE 5

First, soft magnetic particles were formed using a super halide reduction method. $FeCl_2$ as a precursor, and 1 milli-mol of oleic acid and 20 milli-mol of octyl-ether for controlling distance between particles were mixed in a nitrogen atmosphere and heated at a temperature of 100° C. Subsequently, 3 milli-mol of tributyl phosphin $[CH_3(CH_2)_3]_3P$ for controlling the diameter of particles is added and heated at a temperature of 200° C. The particle diameter R of the fine particles depends on the length of the molecule chain of tributyl phosphin, and in this case, the diameter R equals to 7 to 10 nm.

Next, after adding 1 mil of di-octyl-ether and 2 milli-mol of super hydride ($LiBEt_3H$) while stirring the above-described solution, the solution was heated at a temperature of 200° C. for 20 minutes, and cooled to 60° C. or below. Through this reduction process, Fe fine particles whose surfaces are covered with alkyl chains were formed.

Thereafter, ethanol is dripped onto the above solution until a precipitate began to be separated, and the solution containing the precipitate was centrifuged. Waxy magnetic particles were re-dispersed in 10 ml of hexane in which 0.1 to 0.5 ml of oleic acid was added, and by adding ethanol to improve flowability, a Fe-particle colloid solution was produced. Note that oleic acid is used for stabilizing the solution.

Meanwhile, a flat Si substrate was prepared as the non-magnetic substrate 13, and a Fe film of about 200 nm in thickness was formed thereon by a sputtering method as the soft magnetic film 23A.

The Fe fine particles colloid solution produced by the above method was spin-coated on the Fe film, and heated at 300° C. to make the organic matter evaporated and the Fe fine particles arranged on the Fe film.

On the soft magnetic layer 23 composed of the Fe particles and the Fe film, multilayers where Co and Pd films were laminated alternately was formed as the ferromagnetic layer 33 by a sputtering method. The thickness of the Co and Pd films were set to 0.3 nm and 0.7 nm respectively, and the number of the layers was set to ten. Furthermore, SOG was spin-coated thereon to flatten the surface, and then a C-protection film of 10 nm in thickness was formed by a sputtering method. In order to remove domain walls of Fe, the sample was introduced in a Helmholtz coil and magnetized at 15 kOe in a rotational direction of the disk.

Thereafter, R/W test was conducted. When write-in was performed at a frequency of 1 MHz and with 40 mA, the reproduction signal of about 300 mV at the output of a pre-amplifier was obtained, and no occurrence of spike noise was observed.

The magnetic recording medium of example 5 showed S/N ratio higher than that of the magnetic recording media of examples 1 and 2. This shows that the projected parts and the recessed parts of the soft magnetic layer formed by soft magnetic particles of 7 to 10 nm separate surely the magnetic domains of the ferromagnetic layer formed by the multilayers.

Fourth Embodiment

A magnetic recording medium according to a fourth embodiment uses a non-magnetic substrate having projected parts and recessed parts formed thereon similarly to the first embodiment, and the fourth embodiment relates to the magnetic recording medium capable of producing a simpler manufacturing method.

Figure 9:
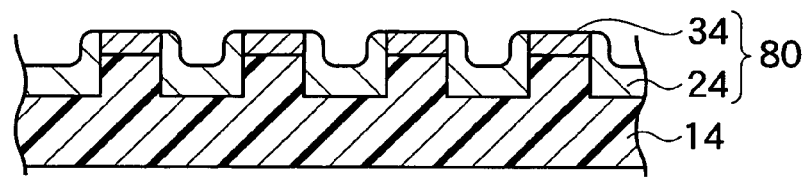
FIG. 9 is a cross-sectional view of a magnetic recording medium according to a fourth embodiment of the present invention.

FIG. 9 shows the magnetic recording medium according to the fourth embodiment. This magnetic recording medium has continuous magnetic layers 80 formed on a non-magnetic substrate 14 having a plurality of projected parts arranged regularly and recessed parts surrounding each projected part on the surface thereof. Among these continuous magnetic layers 80, the magnetic layer 80 formed on the projected part of the non-magnetic substrate 14 serves as a recording area 34 showing perpendicular magnetic anisotropy and ferromagnetism. The magnetic layer 80 formed at the part other than the above areas, that is, formed at the side faces of the recessed parts and the bottom thereof serve as soft magnetic areas 24, which are non-recording areas.

In order to perform perpendicular magnetic recording by use of a single magnetic head, a magnetic loop has to be formed between the medium and the head. However, a soft magnetic layer need not exist under recording areas made of ferromagnetic substance. Like the magnetic recording medium according to the fourth embodiment, as long as the soft magnetic areas 24 surround each recording area 34, the soft magnetic areas 24 can become a path of the magnetic flux to form a magnetic loop. Therefore, perpendicular magnetic recording by use of a single magnetic pole head can be achieved.

In order to form the structure of the magnetic recording medium according to the fourth embodiment, it is satisfactory that the non-magnetic substrate having the recesses/projections is formed by an injection molding method similarly to the first embodiment, and multilayers such as Co/Pd or Co/Pt is formed directly thereon. When forming a Co/Pt mutilayers for example, a fine laminated structure can be obtained on the upper surface of the projection and then ferromagnetism is exhibited. On the other hand, the magnetic recording medium does not take a laminated structure on sides and bottoms of the recessed parts, and thus the ferromagnetism characteristic of the multilayers is not exhibited, but soft magnetism is exhibited. Therefore, the Co/Pt multilayers formed on the upper surface of the projected parts serve as the recording areas 34, and the Co/Pt multilayers layer of other than the above areas serve as the non-recording areas 24.

According to the manufacturing method of the fourth embodiment, damage generated due to etching can be avoided and the number of films can be reduced, thereby simplifying the processes.

An example according to the fourth embodiment will be described below.

EXAMPLE 6

First, a polycarbonate substrate having a plurality of projected parts arranged regularly and recessed parts surrounding each projected part thereon was formed by injection-molding with the same condition as that of example 2. That is, a mold having fine projected parts and recessed parts is formed using the self-organizing function of block copolymer, and using this mold, as shown in FIG. 3B, a non-magnetic substrate 14 of a hexagonal lattice pattern of about 40 nm in the projected part and 80 nm in pitch, and made of polycarbonate of 50 nm in recess/projection height was formed.

Subsequently, an artificial lattice layer where Co and Pd films were laminated alternately was formed by a sputtering method as a magnetic layer 80 on the surface of the polycarbonate substrate. The thickness of the Co and Pd films were set to 0.3 nm and 0.7 nm respectively, and the number of the layers was set to ten.

SOG was spin-coated over this layer to flatten the surface, and then a C-protection film of 10 nm in thickness was formed by a sputtering method.

R/W test was conducted. When write-in was performed at a frequency of 1 MHz and with 40 mA, the reproduction signal of about 200 mV at the output of a pre-amplifier was obtained, and no occurrence of spike noise was observed. The signal output is slightly lower than that of the magnetic recording media of examples 1 and 2. However, a reproduction signal having a practically sufficient sensitivity was obtained.

Other Embodiments

A magnetic recording medium according to another embodiment, serving as patterned media formed without going through etching process similarly to the above-described first to fourth embodiments; having a soft magnetic layer at least around the ferromagnetic layer; and capable of performing perpendicular magnetic recording by a single magnetic pole head, will be described below.

Figure 10A:
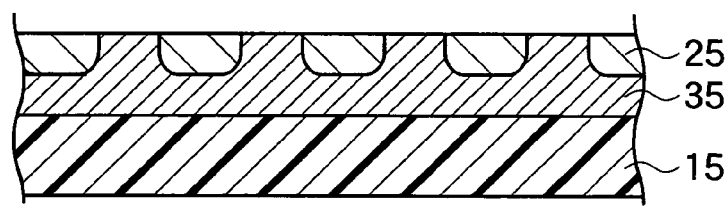
FIG. 10A is a cross-sectional view of a magnetic recording medium according to another embodiment of the present invention.
Figure 10B:
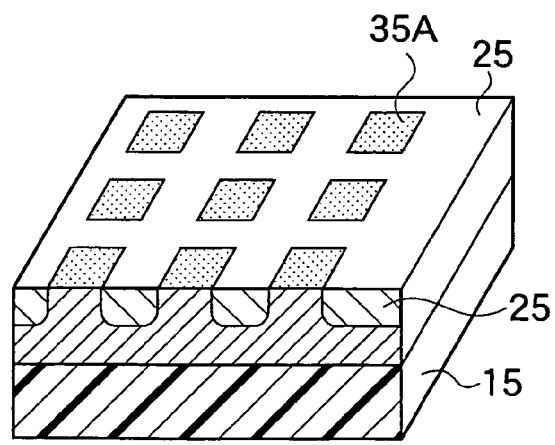
FIG. 10B is a perspective view of the magnetic recording medium according to the another embodiment.

FIGS. 10A and 10B show the magnetic recording medium according to the other embodiment. This magnetic recording medium has a ferromagnetic layer 35 provided on a non-magnetic substrate 15 and soft magnetic areas 25 formed by transforming the ferromagnetic layer 35 chemically. As shown in the perspective view of FIG. 10B, the soft magnetic areas 25 are formed so as to surround a plurality of exposed recording areas 35A of the ferromagnetic layer 35. Each recording area 35A is preferably made to be an area completely independent each other, but by surrounding at least the upper part of the ferromagnetic layer 35 with the soft magnetic area 25 as shown in FIG. 10B, each recording area 35A can be separated from each other magnetically.

Note that the dimensions of each recording area 35A are set to 100 nm square or less, preferably 80 nm or less so that the recording area 35A is in a single magnetic domain state where the magnetism orientation is uniformly arranged in one direction. The recording area 35A can take various shapes such as a circle or an ellipse, not being limited to a rectangle.

Figure 1A:
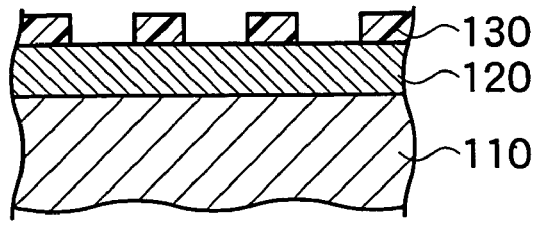
FIGS. 1A to 1E are process views showing a method for manufacture of a patterned media used conventionally.
Figure 1B:
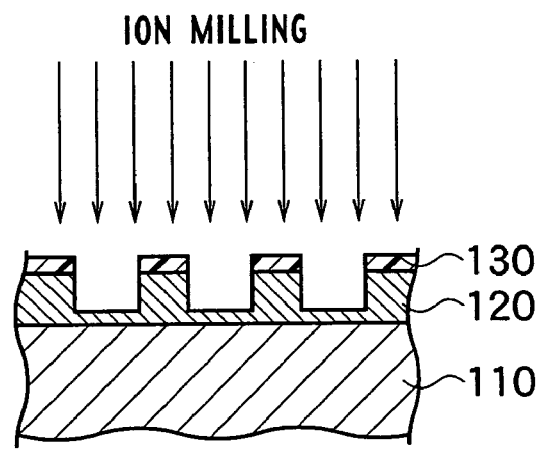
Figure 1C:
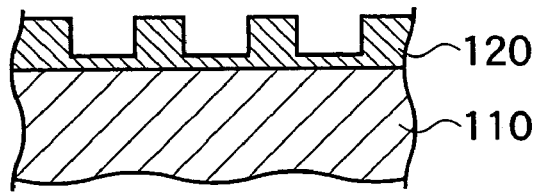
Figure 1D:
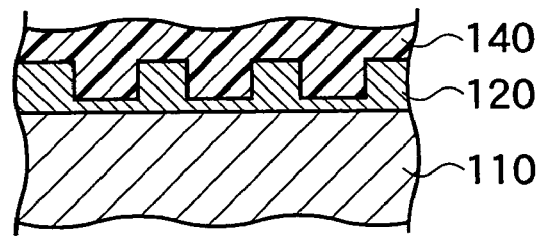
Figure 1E:
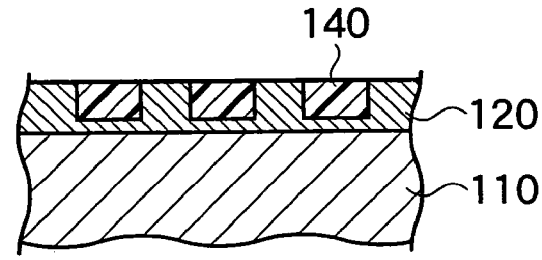
Figure 11A:
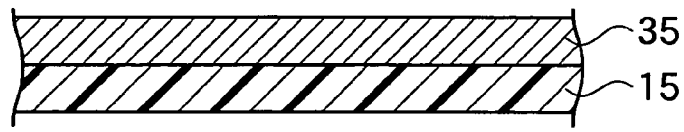
FIGS. 11A to 11E are cross-sectional views showing steps of a method for manufacture of the magnetic recording medium according to the another embodiment.

The method of manufacturing a magnetic recording medium shown in FIGS. 10A and 10B will be described below with reference to FIGS. 11A to 1E.

Figure 11B:
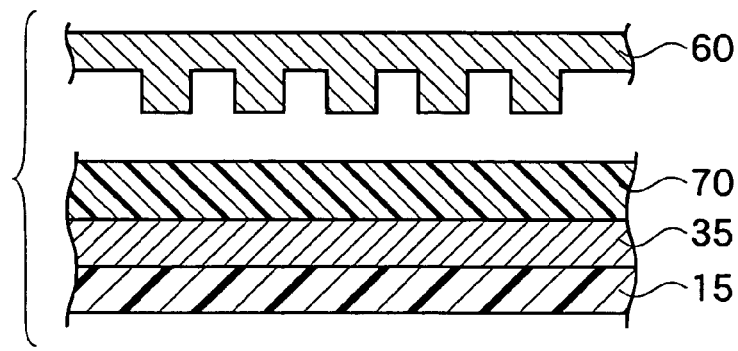

First, the ferromagnetic layer 35 constituted by an artificial lattice layer such as Co/Pd is formed on a flat non-magnetic substrate 15 by a sputtering method. Next, as shown in FIG. 11B, a photoresist 70 is spin-coated on the ferromagnetic layer 35, and projected parts and recessed parts are transferred onto the photoresist 70 by use of a stamper 60 and by a nano-imprint method. The same stamper used in example 4 can be used as a stamper 60.

Figure 11C:
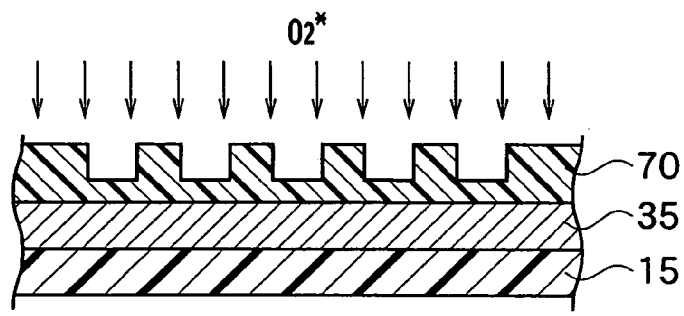

Next, as shown in FIG. 11C, the remaining resist left on the bottoms of recesses of the photoresist 70 formed by use of the nano-imprint method is removed by ashing using oxygen plasma to expose the ferromagnetic layer 35.

Figure 11D:
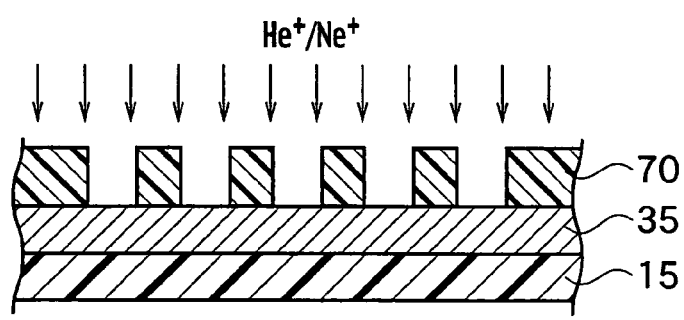
Figure 11E:
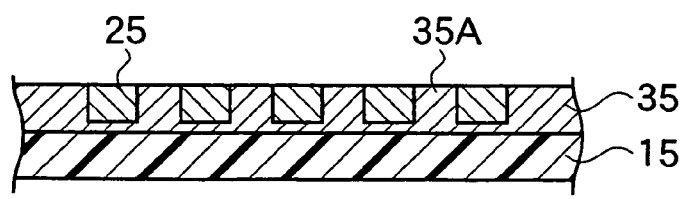

Furthermore, as shown in FIG. 11D, it is irradiated by low mass rare gas ions accelerated electrically using the photoresist 70 as a mask to make portions not covered by the resist be soft-magnetic. $He^+$ and $Ne^+$ are preferable as low mass rare gas ions. The low mass rare gas ions are used in order to prevent the ferromagnetic layer 35 from sputter etched during field acceleration. That is, the artificial lattice layer is irradiated by low-mass rare gas ions by field accelerating, the interface of the artificial lattice is damaged. Therefore, the ferromagnetism is not exhibited any more, and then the ferromagnetic layer 35 turns into the soft magnetic areas 25. Thereafter, the resist is removed by an oxygen asher and a patterned media shown in FIG. 11E can be obtained.

According to the magnetic recording medium and the manufacturing method for it, the patterned media can be formed without requiring the ferromagnetic layer 35 to be etched, and thus noise generated due to etching damage can be avoided. Moreover, because the recording areas 35A are surrounded by the soft magnetic areas 25, during writing and reading by use of a single magnetic pole head, the soft magnetic areas 25 serve as a path of the magnetic flux, and a closed magnetic loop can be formed between the head and the medium. Thus, perpendicular magnetic recording can be performed. Furthermore, in this method, since projected parts and recessed parts are not formed on the surface of the magnetic recording medium, the flattening process can be omitted.

An example according to the other embodiment will be described below.

EXAMPLE 7

First, an artificial lattice where Co and Pd films were laminated alternately was deposited by a sputtering method as the ferromagnetic layer 35 on a flat Si substrate, a non-magnetic substrate 15. The thickness of the Co and Pd films were set to 0.3 nm and 0.7 nm respectively, and the number of the layers was set to ten. The magnetic characteristic in the vertical direction of the ferromagnetic layer is 0.8 in squareness ratio and 2500 Oe in coercive force. Thereafter, a photoresist was spin-coated by about 150 nm in thickness. This photoresist was subjected to nano-imprinting process using a Ni stamper formed by the same method as the injection-molding mold of example 2, which is patterned using the phase-separation of PS-PMMA di-block copolymer to form projected parts and recessed parts.

Next, the photoresist was etched by RIE for 20 seconds to remove remaining resist left on the bottoms of recesses. Thereafter, using this resist pattern as a mask, a $He^+$ ion beam was irradiated onto the exposed ferromagnetic layer at an acceleration voltage of 400 V, with an electrical current of 100 mA. Subsequently, the resist was removed by oxygen asher. A C-protection film of 10 nm in thickness was further formed by a sputtering method.

R/W test was conducted. When write-in was performed at a frequency of 1 MHz and with 40 mA, the reproduction signal was about 200 mV at the output of a pre-amplifier. No occurrence of spike noise was observed.

The magnetic recording media of the present invention, the manufacturing methods therefore, and the like have been described using the embodiments. However, the present invention is not limited to these embodiments. It is apparent to those skilled in the art that various improvements and substitutions can be made to the present invention.

As described above, according to the characteristics of the magnetic recording media of the present invention, the ferromagnetic layer can be formed on the soft magnetic layer having recesses/projections thereon, and the patterned media having the projected part separated magnetically by the recess/projection shape effect, can be obtained. Because the structure does not need the etching of the ferromagnetic layer in forming a patterned media, noise generated due to damage by etching can be suppressed. Moreover, because of having the soft magnetic layer as a base layer of the ferromagnetic layer, during writing and reading by use of a single magnetic pole head, a magnetic flux loop can be formed between the head and the medium, thereby enabling high-density perpendicular magnetic recording.

According to the characteristic of the manufacturing method of the magnetic recording medium of the present invention, the recesses and projections are formed on the non-magnetic substrate, and the soft magnetic layer and the ferromagnetic layer are formed thereon. Therefore, the recesses and projections shape reflecting the recesses and projections of the non-magnetic substrate can be formed on each layer. By this shape effect, the recording area composed of the ferromagnetic substance and separated magnetically from surrounding area can be formed at only projected part. Moreover, because of having the soft magnetic layer as a base layer of the ferromagnetic layer, during writing and reading by use of a single magnetic pole head, a magnetic flux loop can be formed between the head and the medium. According to this method, because patterned media can be formed without going through an etching process, the processes can be simple free of any damage generated due to etching. Noise generated due to the damage can be suppressed also. Moreover, because the projected parts and the recessed parts of the non-magnetic substrate are formed by injection-molding, the method is suitable in terms of productivity.

According to the magnetic recording medium and manufacturing method for the same according to the another embodiment of the present invention, recording areas can be formed only at projected parts. The recording areas are made of ferromagnetic substance and magnetically separated from the surrounding area. That is, according to this method, patterned media can be formed without going through an etching process. Noise generated due to the damage by etching can be suppressed. Furthermore, because the recording areas made of ferromagnetic material are surrounded by non-recording areas having soft magnetism, during writing and reading by use of a single magnetic pole head, a magnetic flux loop can be formed between the head and the medium. Moreover, according to this structure and method, because the recording areas made of ferromagnetic material and the non-recording areas having soft magnetism are formed in the same layer, the process of forming films can be simplified.

As described above, according to the magnetic recording media and manufacturing methods of the present invention, magnetic recording media functioning as patterned media and excellent in the thermal fluctuation resistance can be produced using the simpler method without going through a process of etching the ferromagnetic layer. Noise generated due to the damage by etching and domain walls in the soft magnetic layer can be suppressed, and thus high-density perpendicular magnetic recording media with less noise can be provided.

What is claimed is:

1. A magnetic recording medium comprising:
   a non-magnetic substrate;
   a soft magnetic layer formed on the non-magnetic substrate, the soft magnetic layer including a plurality of projected parts arranged regularly on a surface thereof and recessed parts surrounding each of the projected parts;
   a ferromagnetic layer formed on the soft magnetic layer, the ferromagnetic layer including projected parts and recessed parts reflecting the projected parts and the recessed parts of the soft magnetic layer; and
   recording areas having perpendicular magnetic anisotropy and ferromagnetism, the recording areas being formed of the projected parts of the ferromagnetic layer and being separated magnetically from their surroundings.

2. The magnetic recording medium according to claim 1, wherein the non-magnetic substrate includes a plurality of projected parts arranged regularly on a surface thereof and recessed parts surrounding each of the projected parts, and the projected parts and recessed parts of the soft magnetic layer reflect the recessed parts and the projected parts of the non-magnetic substrate.

3. The magnetic recording medium according to claim 1, wherein the non-magnetic substrate has a flat surface, and the soft magnetic layer has the projected parts and the recessed parts on the surface thereof.

4. The magnetic recording medium according to claim 3, wherein the soft magnetic layer comprises
   a soft magnetic film having a flat surface; and
   soft magnetic particles arranged regularly separately from each other on the soft magnetic film.

5. The magnetic recording medium according to claim 1, wherein the soft magnetic layer has such a thickness that a magnetic orientation thereof is stably uniform in an in-plane direction during writing and reading.

6. The magnetic recording medium according to claim 1, wherein a thickness L1 of the soft magnetic layer is at least twice a height L2 of the projected parts of the soft magnetic layer, the thickness and the height being measured along a direction perpendicular to a plane of the substrate.

7. The magnetic recording medium according to claim 1, wherein a thickness of the ferromagnetic layer is set to be from ½ to ¼ of a height L2 of the projected parts of the soft magnetic layer, the thickness and the height being measured along a direction perpendicular to a plane of the substrate.

8. The magnetic recording medium according to claim 1, wherein the ferromagnetic layer is made of an artificial lattice layer.

9. A magnetic recording medium comprising:
   a flat non-magnetic substrate;
   a ferromagnetic layer formed on the non-magnetic substrate, the ferromagnetic layer including a plurality of projected parts and recessed parts, the projected parts of the ferromagnetic layer serving as recording areas having perpendicular magnetic anisotropy; and
   non-recording areas having soft magnetism, buried in the recessed parts of the ferromagnetic layer so as to surround the recording areas.

10. The magnetic recording medium according to claim 9, wherein the ferromagnetic layer is made of an artificial lattice layer.

* * * * *